United States Patent
Butcher et al.

(10) Patent No.: US 9,619,415 B2
(45) Date of Patent: Apr. 11, 2017

(54) SYSTEM AND METHOD FOR INTELLIGENT PLATFORM MANAGEMENT INTERFACE KEYBOARD CONTROLLER STYLE INTERFACE MULTIPLEXING

(71) Applicants: Wade A. Butcher, Cedar Park, TX (US); Richard L. Holmberg, Austin, TX (US)

(72) Inventors: Wade A. Butcher, Cedar Park, TX (US); Richard L. Holmberg, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 703 days.

(21) Appl. No.: 13/691,483

(22) Filed: Nov. 30, 2012

(65) Prior Publication Data

US 2014/0156905 A1 Jun. 5, 2014

(51) Int. Cl.
*G06F 13/36* (2006.01)
*G06F 13/24* (2006.01)

(52) U.S. Cl.
CPC .............. *G06F 13/36* (2013.01); *G06F 13/24* (2013.01)

(58) Field of Classification Search
CPC .................................. G06F 13/36; G06F 13/24
See application file for complete search history.

(56) References Cited

U.S. PATENT DOCUMENTS

| | | | |
|---|---|---|---|
| 6,496,891 B1 * | 12/2002 | Cluff et al. | 710/260 |
| 7,436,149 B2 | 10/2008 | Luo et al. | |
| 2011/0307746 A1 * | 12/2011 | Sullivan et al. | 714/57 |
| 2014/0006645 A1 * | 1/2014 | Matlock | 710/5 |
| 2014/0032792 A1 * | 1/2014 | Kanigicherla et al. | 710/22 |
| 2014/0136738 A1 * | 5/2014 | Matlock et al. | 710/104 |

* cited by examiner

*Primary Examiner* — Nimesh G Patel
(74) *Attorney, Agent, or Firm* — Larson Newman, LLP

(57) ABSTRACT

An information handling system includes a processing node, an input/output (I/O) module coupled to the processing node via a high bandwidth interface, and a service processor coupled to the I/O module via a multi-master interface. A transaction between the processing node and the service processor that is targeted to a low pin count (LPC) bus is executed between the processing node and the service processor via the high bandwidth interface and the multi-master interface.

12 Claims, 4 Drawing Sheets

SYSTEM AND METHOD FOR INTELLIGENT PLATFORM MANAGEMENT INTERFACE KEYBOARD CONTROLLER STYLE INTERFACE MULTIPLEXING

FIELD OF THE DISCLOSURE

This disclosure relates generally to information handling systems, and relates more particularly to intelligent platform management interface (IPMI) keyboard controller style (KCS) interface multiplexing.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems. An information handling system can include virtual machines that run operating systems and applications on a common host system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion focuses on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

Figure 1:
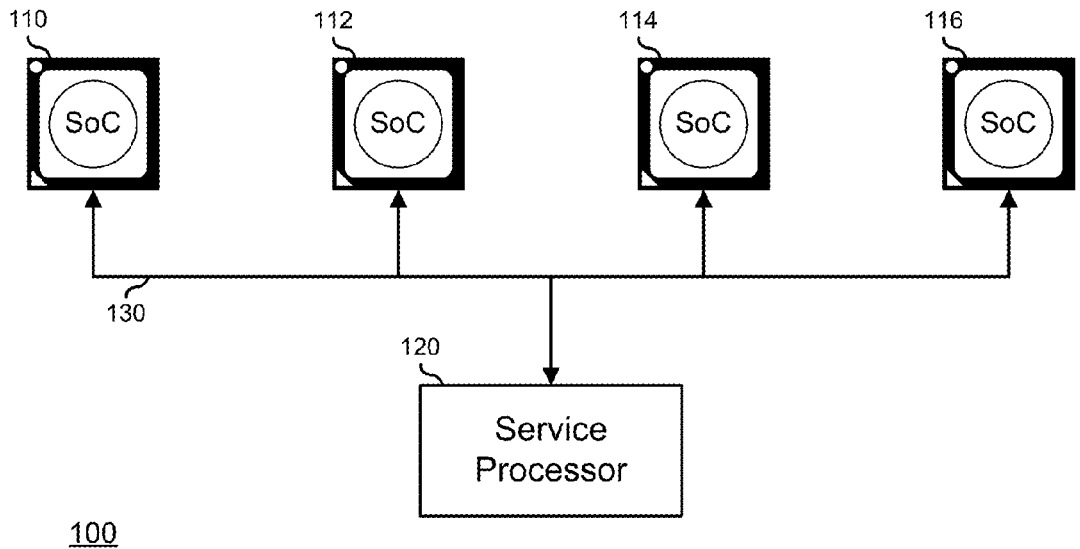
FIG. 1 is a block diagram of a microserver according to an embodiment of the present disclosure.

FIG. 1 illustrates a microserver 100 for one or more information handling systems. For the purpose of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

Microserver 100 includes system-on-a-chip (SoC) nodes 110, 112, 114, and 116, a service processor 120, and a multi-master bus 130. Microserver 100 represents an enterprise server that is intended to provide readily scalable parallel performance where the services and applications of the server can easily meet increased demands by deploying a greater number of servers that each instantiate a separate operating system and that each run the same software. As such, SoC nodes 110, 112, 114, and 116 each represent an integrated circuit that integrates the components of an information handling system onto a single device, and that can each instantiate a separate operating system and that can perform the processing tasks of the deployed services and applications independently from the other SOC nodes. Service processor 120 represents an embedded controller of microserver 100 that operates to manage an interface between system management utilities and the software and hardware of the microserver. In a particular embodiment, service processor 120 represents a microcontroller that implements an Intelligent Platform Management Interface (IPMI) architecture, such as an IPMI Specification V2.0, on microserver 100. For example, service processor 120 can represent a Baseboard Management Controller (BMC), an integrated Dell Remote Access Controller (iDRAC), or another service processor, as needed or desired.

Multi-master bus 130 represents a data bus of microserver 100 that permits arbitration between multiple bus masters, such as between service processor 130 and SoC nodes 110, 112, 114, and 116. An example of multi-master bus 120 includes an Inter-Integrated Circuit ($I^2C$) bus, a Control Area Network (CAN) bus, another multi-master bus, or a combination thereof, as needed or desired. In a particular embodiment, multi-master bus 120 operates to handle IPMI services between service processor 130 and SoC nodes 110, 112, 114, and 116. In particular, multi-master bus 120 operates to handle management services associated with an I²C bus, including Intelligent Platform Management Bus (IPMB) interactions, hardware monitoring, power supply services, memory management, and other management services, as needed or desired. In another embodiment, multi-master bus 120 operates to handle management services associated with a Low-Pin Count (LPC) bus, such as Keyboard Controller Style (KCS) services. Here, although an LPC bus may not be suitable for systems where multiple processing nodes are communicating with a single service processor, such as is the case in microserver 100, management services, such as systems management services (SMS) and other management services, may rely upon KCS interactivity between the processing nodes and the service processor. As such, microserver 100 operates to emulate KCS services and other LPC bus interactions between service processor 130 and SoC nodes 110, 112, 114, and 116 by emulating an LPC bus in software in each SoC node, and transferring the interactions between the SoC nodes and service processor via multi-master bus 130. In a particular embodiment, the software that emulates the LPC bus resides in a Basic Input/Output System (BIOS) or extensible firmware interface (EFI) of SoC nodes 110, 112, 114, and 116. In another embodiment, the software is included as a driver or firmware associated with service processor 120.

Figure 2:
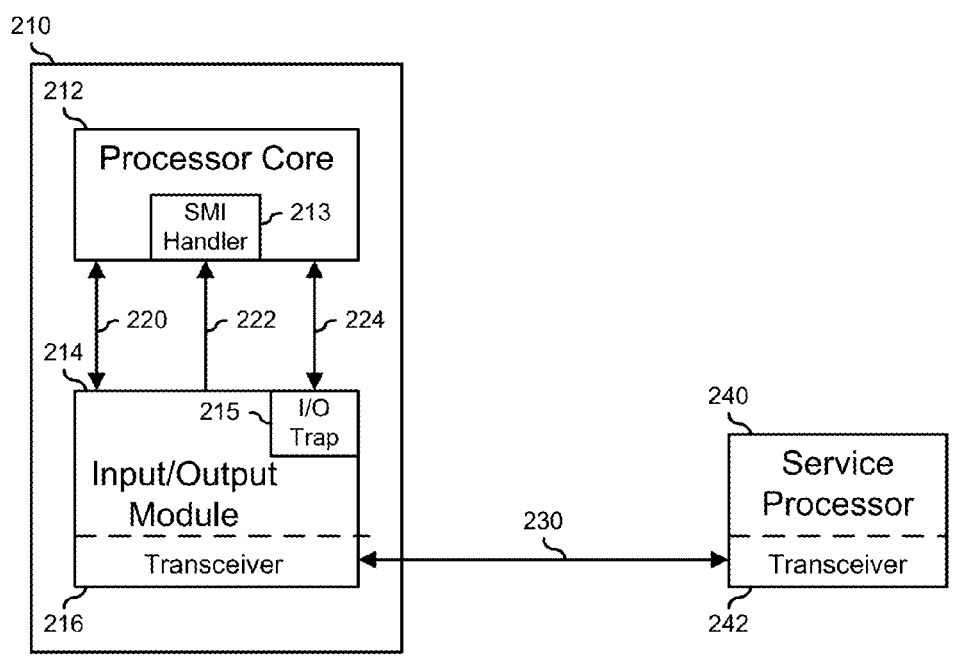
FIG. 2 is a block diagram of a microserver according to another embodiment of the present disclosure.

FIG. 2 illustrates a microserver 200 similar to microserver 100, including one or more SoC node 210 similar to SoC nodes 110, 112, 114, and 115, a multi-master bus 230 similar to multi-master bus 130, and a service processor 240 similar to service processor 120. SoC node 210 includes one or more processor core 212 and an input/output (I/O) module 214. Processor core 212 represents a central processing unit portion of SoC node 210. I/O module 214 represents a chipset portion of SoC node 210, and includes a transceiver 216 associated with multi-master bus 230. SoC node 210 implements a system architecture, such as an X86 architecture, a HyperTransport architecture, or another architecture, as needed or desired. As such, processor core 212 and I/O module 214 are connected together via various control and data communication interfaces, including a main interface 220, an interrupt management interface 222, and an LPC bus 224. Main interface 220 represents a high throughput interface, such as a Peripheral Component Interface-Express (PCIe) interface, a Direct Media Interface (DMI), or another high throughput interface, as needed or desired. Interrupt management interface 222 represents a management controller interface between processor core 212 and I/O module 214, and can include a System Management Interrupt indication from the I/O module to the processor core. In a particular embodiment, LPC bus 224 is not implemented in hardware in SoC node 210, but rather, LPC bus traffic is emulated within the architecture of the SoC node. Service processor 240 includes a transceiver 242 associated with multi-master bus 230.

In a particular embodiment, SoC node 210 operates to handle LPC bus services by emulating KCS services between processor core 212 and I/O module 214 in software, and transferring the interactions between the SoC node and the service processor via multi-master bus 230. Here, management services implemented on SoC node 210 generate KCS transactions on LPC bus 224 between processor core 212 and I/O module 214. I/O module 214 includes an I/O trap 215 that detects KCS transactions received on LPC bus 224, and that causes the I/O module to issue a System Management Interrupt (SMI) signal to processor core 212 on interrupt management interface 222. Processor core 212 receives the SMI signal and launches an SMI handler 213. SMI handler 213 operates to reissue the KCS transactions on main interface 220 for transmission to service processor 240 on multi-master bus 230. In a particular embodiment, the software that emulates KCS transactions resides in a BIOS, an EFI, or in other software or firmware associated with service processor 240, as needed or desired.

Figure 3:
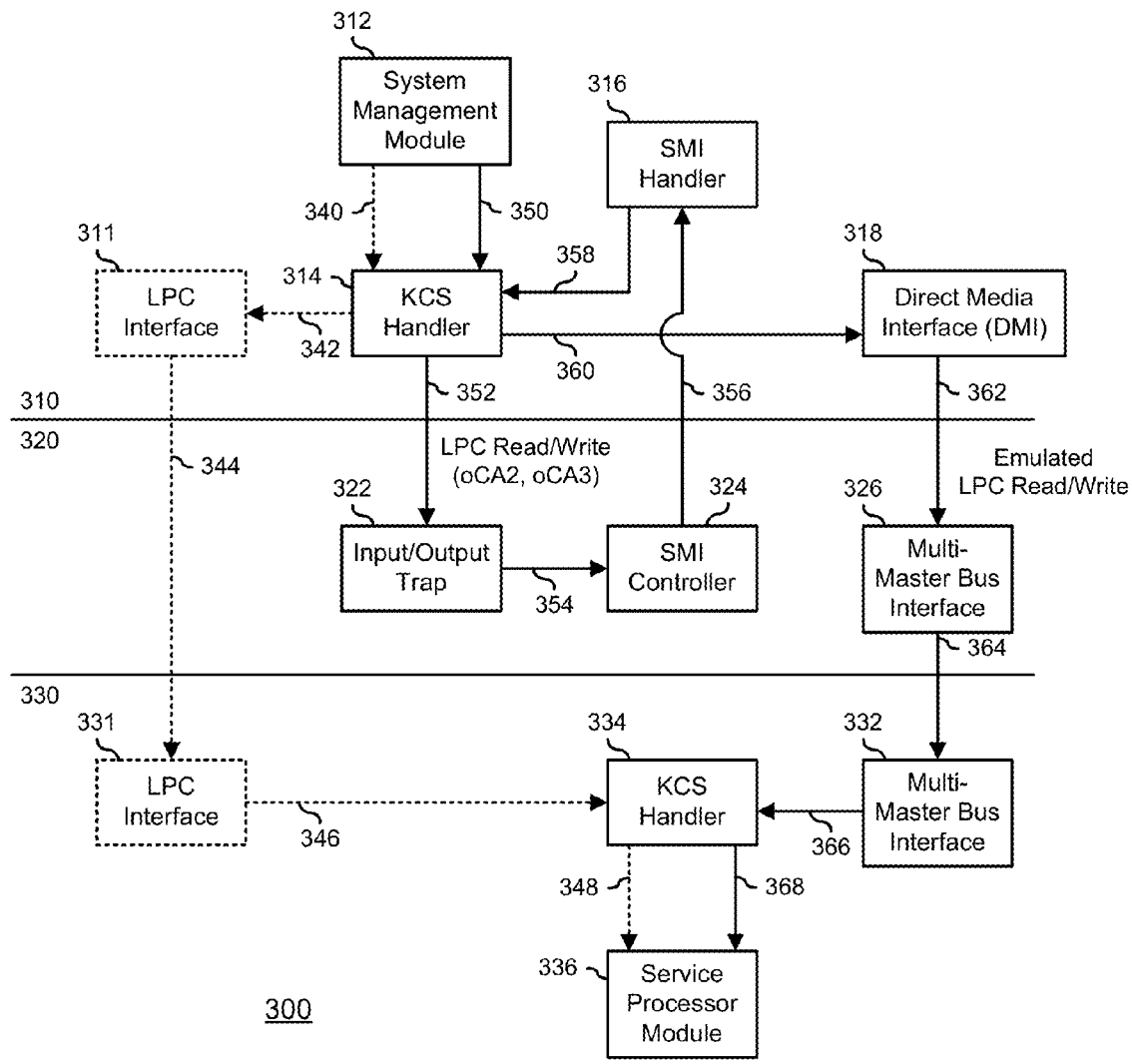
FIG. 3 is a block diagram of a microserver according to another embodiment of the present disclosure, and a method of use thereof.

FIG. 3 illustrates a microserver 300 similar to microserver 200, including a SoC node with a processor core 310, an I/O module 320, and a service processor 330. Processor core 310 includes functional blocks including a system management module 312, an LPC interface 311, a KCS handler 314, an SMI handler 316, and a DMI interface 318. I/O module 320 includes functional blocks including an I/O trap 322, an SMI controller 324, and a multi-master bus interface 326. Service processor 330 includes functional blocks including an LPC interface 331, a multi-master bus interface 332, a KCS handler 334, and service processor module 336. The functional blocks of processor core 310, I/O module 320, and service processor 330 each represent hardware of their respective devices, software executed on microserver 300, or a combination thereof.

In a particular embodiment, microserver 300 operates in a legacy mode for handling LPC-based system management functionality. Here, system management module 312 issues a request 340 to KCS handler 314 in order to perform a particular system management function. The request can include an LPC read, an LPC write, or another LPC command, as needed or desired. KCS handler 314 directs the request 342 to LPC interface 311 which, in turn forwards the request 344 to LPC interface 331, via an LPC bus (not illustrated). LPC interface 331 forwards the request 346 to KCS handler 334. KCS handler 334 provides the request 348 to service processor module 336 which processes the specified request. For example, service processor module 336 can issue data associated with an LPC write to a specified register or other location of service processor 330. Where the request is an LPC read, service processor module 336 can read data from a specified register or other location of the service processor. Further, when the request is an LPC read, service processor 330 can provide the requested data back to processor core 310, as described below.

In another embodiment, microserver 300 operates in an emulated LPC mode for handling LPC-based system management functionality. Here, system management module 312 issues request 350 to KCS handler 314, and the KCS handler directs the request 352 to I/O module 320, for example, via an internal bus such as a PCIe interface, a DMI interface, or another high throughput interface, as needed or desired. Request 352 is identifiable as an LPC-based request based upon an address associated with the request. For example, an LPC-based request can be addressed to an I/O function at an address of 0xCA2 or 0xCA3, or at another address, as needed or desired. I/O trap 322 is configured to recognize when an I/O request is addressed to the specified address, and issues an indication 354 to SMI controller 324. SMI controller 324 determines the source of indication 354 as being associated with an LPC-based transaction, and issues an SMI signal 356 to SMI handler 316 in processor core 310. SMI signal 356 indicates that the interrupt is associated with the LPC-based transaction, and invokes code to handle the interrupt. As such, SMI handler 316 directs 358 KCS handler 314 to reissue the request 360 to DMI interface 318. Here, request 360 is redirected to a new address that is associated with a multi-master bus of microserver 300 that is targeted to service processor 330. Thus, upon receiving request 360, DMI interface 318 issues a transaction 362 to multi-master bus interface 326. Transaction 362 includes the emulated LPC-based request. Multi-master bus interface 326 issues a transaction 364 on the multi-master bus to multi-master bus interface 332. Multi-master bus interface 332 forwards transaction 366 to KCS handler 334 which provides the request 368 to service processor module 336. Processor module 336 processes the specified request as described above.

Figure 4:
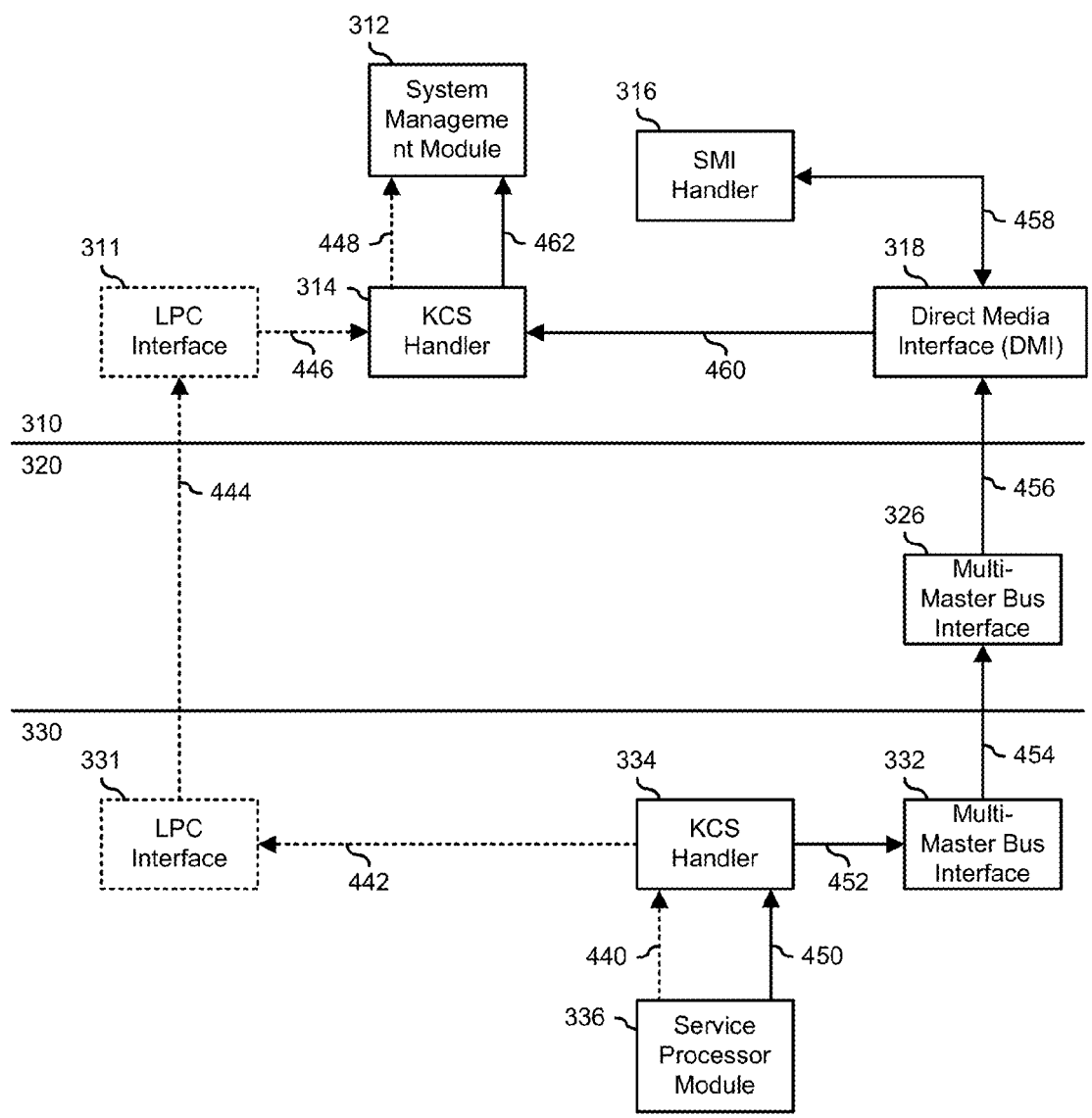
FIG. 4 is a block diagram illustrating a management controller, and a method of use thereof.

FIG. 4 illustrates a method of handling the return of read data on microserver 300. When microserver 300 operates in the legacy mode, service processor module 336 sends requested read data 440 to KCS handler 334 which forwards the read data 442 to LPC interface 331. The read data 444 is forwarded to LPC interface 311 in processor core 310 which forwards the read data 446 to KCS handler 314. Finally, KCS handler 314 provides the read data 448 to system management module 312. When microserver 300 operates in the emulated LPC mode, service processor module 336 sends requested read data 450 to KCS handler 334 which forwards the read data 452 to multi-master bus interface 332. Multi-master bus interface 332 sends the read data 454 to multi-master bus 326 which forwards the read data 456 to DMI interface 318. When the read data 456 is received by DMI interface 318, SMI handler 316 directs 458 DMI interface to forward the read data 460 to KCS handler 314. Finally, KCS handler 314 provides the read data 462 to system management module 312.

A particular embodiment of pseudo-code for an SMI handler is provided below:

| | |
|---|---|
| Wait for IBF (Input Buffer Full) = 0 | [This initiates an I/O read on address 0xCA3. The SMI handler immediately returns a value in which the IBF bit is "0"] |
| Clear OBF (Output Buffer Full) | [This initiates an I/O write on 0xCA3. The SMI handler records the written value and returns] |
| WR_START to CMD | [Notify the SMI handler that a packet is about to be written] |
| Data Byte to DATA | [This initiates an I/O write on 0xCA2. The data value will be recorded in a buffer and the SMI handler will return] |
| WR_END to CMD | [This flags the SMI handler that the next byte is the last byte of the packet] |
| Data Byte to DATA (last byte) | [At this point the SMI handler is ready to send the collected packet over the multi-master bus. This is performed by a chipset transceiver] |
| <<The following steps are for subsequent bus reads>> | |
| Wait for OBF = 1 | [The SMI handler sets this bit in an emulated status register after the SMI handler receives a complete packet on the multi-master bus] |
| Read Data Byte from DATA_OUT | [The SMI handler provides one byte at a time requested by the "IN" instruction on which the I/O module traps] |
| Write READ Byte to DATA_IN | [This step is the way the KCS bus informed the BMC that the data has been consumed. Here, the SMI handler will return] |
| Read Dummy Data from DATA_OUT | [When there is no data remaining in the previously read packet, the SMI handler provides an arbitrary value (0xFF) and returns]. |

Figure 5:
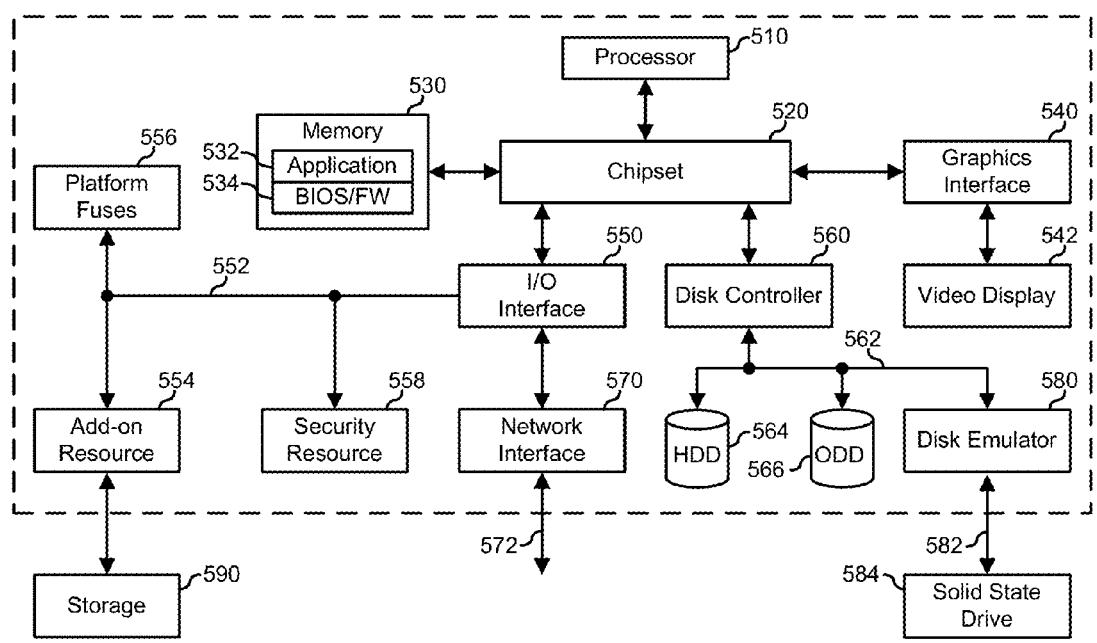
FIG. 5 is a block diagram illustrating an exemplary embodiment of an information handling system.

FIG. 5 illustrates an information handling system 500, including a processor 510, a chipset 520, a memory 530, a graphics interface 540, an input/output (I/O) interface 550, a disk controller 560, a network interface 570, and a disk emulator 580. In a particular embodiment, information handling system 500 is used to carry out one or more of the methods described herein. In another embodiment, one or more of the systems described herein are implemented in the form of information handling system 500.

Chipset 520 is connected to and supports processor 510, allowing the processor to execute machine-executable code. In a particular embodiment, information handling system 500 includes one or more additional processors, and chipset 520 supports the multiple processors, allowing for simultaneous processing by each of the processors and permitting the exchange of information among the processors and the other elements of the information handling system. Chipset 520 can be connected to processor 510 via a unique channel, or via a bus that shares information among the processor, the chipset, and other elements of information handling system 500.

Memory 530 is connected to chipset 520. Memory 530 and chipset 520 can be connected via a unique channel, or via a bus that shares information among the chipset, the memory, and other elements of information handling system 500. In another embodiment (not illustrated), processor 510 is connected to memory 530 via a unique channel. In another embodiment (not illustrated), information handling system 500 includes separate memory dedicated to each of the one or more additional processors. A non-limiting example of memory 530 includes static random access memory (SRAM), dynamic random access memory (DRAM), non-volatile random access memory (NVRAM), read only memory (ROM), flash memory, another type of memory, or any combination thereof.

Graphics interface 540 is connected to chipset 520. Graphics interface 540 and chipset 520 can be connected via a unique channel, or via a bus that shares information among the chipset, the graphics interface, and other elements of information handling system 500. Graphics interface 540 is connected to a video display 542. Other graphics interfaces (not illustrated) can also be used in addition to graphics interface 540 as needed or desired. Video display 542 includes one or more types of video displays, such as a flat panel display, another type of display device, or any combination thereof.

I/O interface 550 is connected to chipset 520. I/O interface 550 and chipset 520 can be connected via a unique channel, or via a bus that shares information among the chipset, the I/O interface, and other elements of information handling system 500. Other I/O interfaces (not illustrated) can also be used in addition to I/O interface 550 as needed or desired. I/O interface 550 is connected via an I/O interface 552 to one or more add-on resources 554. Add-on resource 554 is connected to a storage system 590, and can also include another data storage system, a graphics interface, a network interface card (NIC), a sound/video processing card, another suitable add-on resource or any combination thereof. I/O interface 550 is also connected via I/O interface 552 to one or more platform fuses 556 and to a security resource 558. Platform fuses 556 function to set or modify the functionality of information handling system 500 in hardware. Security resource 558 provides a secure cryptographic functionality and includes secure storage of cryptographic keys. A non-limiting example of security resource 558 includes a Unified Security Hub (USH), a Trusted Platform Module (TPM), a General Purpose Encryption (GPE) engine, another security resource, or a combination thereof.

Disk controller 560 is connected to chipset 520. Disk controller 560 and chipset 520 can be connected via a unique channel, or via a bus that shares information among the chipset, the disk controller, and other elements of information handling system 500. Other disk controllers (not illustrated) can also be used in addition to disk controller 560 as needed or desired. Disk controller 560 includes a disk interface 562. Disk controller 560 is connected to one or more disk drives via disk interface 562. Such disk drives include a hard disk drive (HDD) 564, and an optical disk drive (ODD) 566, and can include one or more disk drive as needed or desired. ODD 566 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 560 is connected to disk emulator 580. Disk emulator 580 permits a solid-state drive 584 to be coupled to information handling system 500 via an external interface 582. External interface 582 can include industry standard busses such as USB or IEEE 1394 (Firewire) or proprietary busses, or any combination thereof. Alternatively, solid-state drive 584 can be disposed within information handling system 500.

Network interface device 570 is connected to I/O interface 550. Network interface 570 and I/O interface 550 can be coupled via a unique channel, or via a bus that shares information among the I/O interface, the network interface, and other elements of information handling system 500. Other network interfaces (not illustrated) can also be used in addition to network interface 570 as needed or desired. Network interface 570 can be a network interface card (NIC) disposed within information handling system 500, on a main circuit board such as a baseboard, a motherboard, or any combination thereof, integrated onto another component such as chipset 520, in another suitable location, or any combination thereof. Network interface 570 includes a network channel 572 that provide interfaces between information handling system 500 and other devices (not illustrated) that are external to information handling system 500. Network interface 570 can also include additional network channels (not illustrated).

Information handling system 500 includes one or more application programs 532, and Basic Input/Output System and Firmware (BIOS/FW) code 534. BIOS/FW code 534 functions to initialize information handling system 500 on power up, to launch an operating system, and to manage input and output interactions between the operating system and the other elements of information handling system 500. In a particular embodiment, application programs 532 and BIOS/FW code 534 reside in memory 530, and include machine-executable code that is executed by processor 510 to perform various functions of information handling system 500. In another embodiment (not illustrated), application programs and BIOS/FW code reside in another storage medium of information handling system 500. For example, application programs and BIOS/FW code can reside in HDD 564, in a ROM (not illustrated) associated with information handling system 500, in an option-ROM (not illustrated) associated with various devices of information handling system 500, in storage system 590, in a storage system (not illustrated) associated with network channel 572, in another storage medium of information handling system 500, or a combination thereof. Application programs 532 and BIOS/FW code 534 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:
1. An information handling system comprising:
a first processor core;

a first input/output (I/O) module coupled to the first processor core via a first direct media interface; and a service processor coupled to the first I/O module via a multi-master interface;

wherein the first processor core sends a first low pin count (LPC) transaction for the service processor via the first direct media interface and the multi-master interface, such that the first LPC transaction is not transmitted via an LPC bus;

wherein the first LPC transaction is intercepted by a first I/O trap of the first I/O module;

wherein the first I/O module is operable to generate a first system management interrupt in response to the first LPC transaction being intercepted by the first I/O trap;

wherein the first system management interrupt is received by a first system management interrupt handler of the first processor core; and the first system management interrupt handler redirects the first transaction to the first direct media interface.

2. The information handling system of claim 1, further comprising:

a second processor core; and a second input/output (I/O) module coupled to the first processor core via a second direct media interface;

wherein:

the service processor is coupled to the second I/O module via the multi-master interface; and the second processor core sends a second LPC transaction for the service processor via the second direct media interface and the multi-master interface.

3. The information handling system of claim 2, wherein:

the second LPC transaction is intercepted by a second I/O trap of the second I/O module, such that the second LPC transaction is not transmitted via the LPC bus;

the second I/O module is operable to generate a second system management interrupt in response to the second LPC transaction being intercepted by the second I/O trap; and the second system management interrupt is received by a second system management interrupt handler of the second processor core; and the second system management interrupt handler redirects the second transaction to the second direct media interface.

4. The information handling system of claim 1, wherein the first LPC transaction is generated by a first keyboard control style handler associated with the first processor core.

5. The information handling system of claim 4, wherein the first LPC transaction is received by a second keyboard control style handler associated with the service processor.

6. The information handling system of claim 1, further comprising:

a system-on-a-chip device that includes the processor core, the I/O module, and the first direct media interface.

7. A method comprising:

receiving, at a first processor core, a first low pin count (LPC) transaction a first processor core;

sending the first LPC transaction for a service processor via a first direct media interface between the first processor core and a first input/output (I/O) module, and via a multi-master interface between the first I/O module and the service processor, such that the first LPC transaction is not transmitted via an LPC bus;

receiving the first LPC transaction at the first I/O module;

intercepting the first LPC transaction by a first I/O trap of the first I/O module;

generating a first system management interrupt in response to the first LPC transaction being intercepted by the first I/O trap;

receiving, by a first system management interrupt handler of the first processor core, the first system management interrupt; and redirecting, by the first system management interrupt handler, the first transaction to the first direct media interface.

8. The method of claim 7, further comprising:

receiving, at a second processor core, a second LPC transaction; and sending the second LPC transaction for the service processor via a second direct media interface between the second processor core and a second I/O module, and via the multi-master interface to the service processor.

9. The method of claim 8, further comprising:

receiving the second LPC transaction at the second I/O module;

intercepting the second LPC transaction by a second I/O trap of the second I/O module, such that the second LPC transaction is not transmitted via an LPC bus;

generating a second system management interrupt in response to the second LPC transaction being intercepted by the second I/O trap;

receiving, by a second system management interrupt handler of the second processor core, the second system management interrupt; and redirecting, by the second system management interrupt handler, the second transaction to the second direct media interface.

10. The method of claim 7, wherein the first LPC transaction is generated by a first keyboard control style handler associated with the first processor core.

11. The method of claim 10, wherein the first LPC transaction is received by a second keyboard control style handler associated with the service processor.

12. A non-transitory computer-readable medium including code for carrying out a method, the method comprising:

receiving, at a first processor core, a first low pin count (LPC) transaction;

sending the first LPC transaction for a service processor via a first direct media interface between the first processor core and a first input/output (I/O) module, and via a multi-master interface between the first I/O module and the service processor, such that the first LPC transaction is not transmitted via an LPC bus;

receiving the first LPC transaction at the first I/O module;

intercepting the first LPC transaction by a first I/O trap of the first I/O module;

generating a first system management interrupt in response to the first LPC transaction being intercepted by the first I/O trap receiving, by a first system management interrupt handler of the first processor core, the first system management interrupt; and redirecting, by the first system management interrupt handler, the first transaction to the first direct media interface.

* * * * *